July 14, 1942.   D. L. BUCHANAN   2,290,139
PIPE HANGER
Filed Feb. 16, 1940
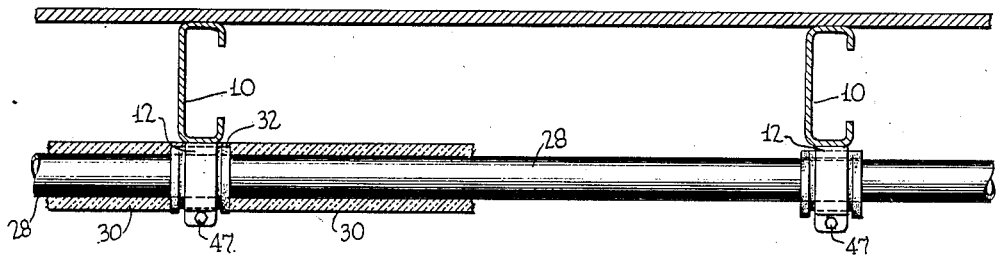
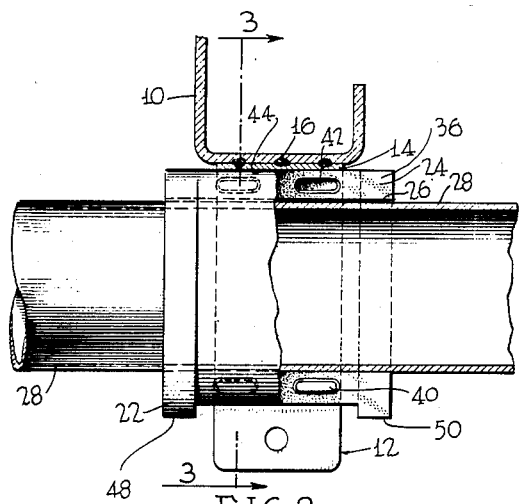
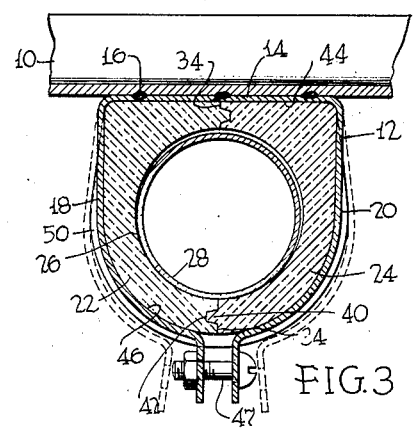
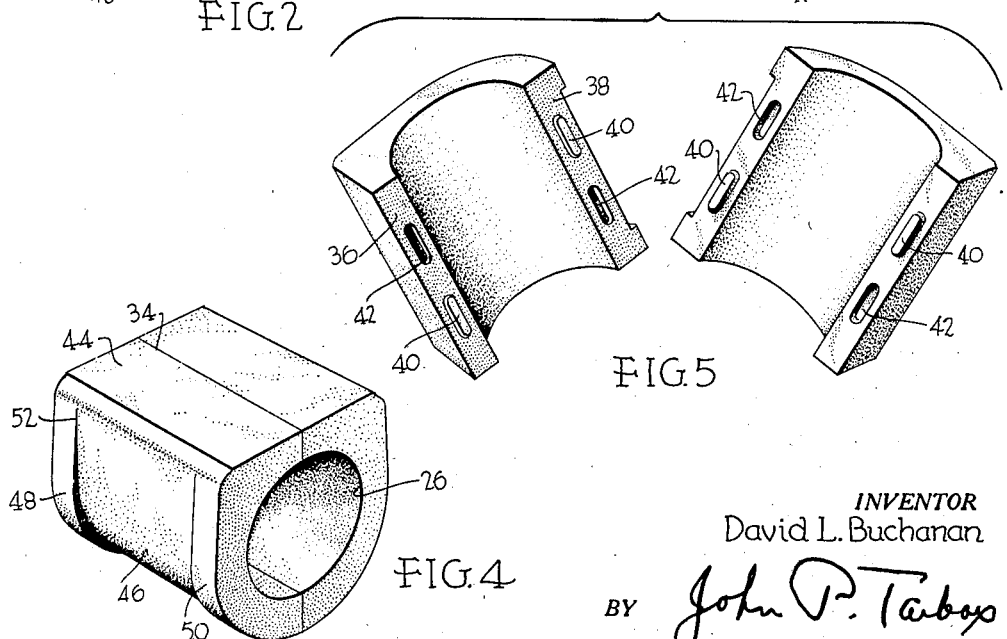
INVENTOR
David L. Buchanan
BY John P. Tarbox
ATTORNEY Patented July 14, 1942

2,290,139

UNITED STATES PATENT OFFICE 2,290,139

PIPE HANGER

David L. Buchanan, Whitemarsh, Pa., assignor to Edward G. Budd Manufacturing Company, Philadelphia, Pa., a corporation of Pennsylvania Application February 16, 1940, Serial No. 319,264

6 Claims. (Cl. 248—58)

This invention relates to a hanger construction adapted for supporting a pipe or the like and in which a bushing between the hanger and pipe is employed.

In supporting steam pipes and the like, from sills, it is desirable to provide a hanger construction which need not be threaded upon the pipe and which can be applied to the pipe after the same has been laid. Particularly in the support of steam pipes and the like underneath railroad cars such hanger construction preferably must not engage the pipe since continuous vibration would be likely to cause the hanger construction to cut through the supported pipe producing leaks.

The present invention is directed to a hanger construction in which a split sleeve is employed, the sleeve being adapted to be assembled about the pipe and slid into position and thereafter embraced by a hanger strap.

An object of the invention is to provide a split sleeve and strap hanger construction which may be readily employed in a support of pipe lines and the like.

Another object of the invention is to provide a split sleeve construction of a heat insulating material which construction is mouldable and each part of which is identical to the other.

Yet, another object of the invention is to provide a split sleeve having a flat external bearing face extending transverse to the split.

A further object of the invention is to provide a split bearing sleeve adapted for assembly into a hanger strap, the sleeve being so constructed as to minimize the extent of deformation of the strap required in assembling the sleeve in position.

The above and other novel features of the invention will appear more fully hereinafter from the following detailed description when taken in conjunction with the accompanying drawing. It is expressly understood, however, that the drawing is for purposes of illustration only and is not designed as a definition of the limits of the invention, reference being had for this purpose to the appended claims.

In the drawing where any like reference characters indicate like parts:

Fig. 1 is a side elevational view of the hanger assembly as applied to spaced sills and a pipe line, parts thereof being shown in section and broken away;

Fig. 2 is an enlarged side elevation, shown partly in section, of one of the hangers of Fig. 1;

Fig. 3 is a section taken substantially on the line 3—3 of Fig. 2;

Fig. 4 is a perspective view of the sleeve members in assembled relation and

Fig. 5 is a perspective view of the sleeve members separated.

Referring to the drawing and more particularly to Figs. 1, 2 and 3, there is shown a pair of spaced sills 10 to which are secured hanger straps 12 having a central flat portion 14 which may be spot welded or otherwise secured to the sills as at 16. The strap is provided with depending end portions 18 and 20 adapted to embrace the exterior contour of split sleeve members 22 and 24. The split sleeve has an aperture 26 therethrough which may loosely support a steam pipe 28 or the like. In order to avoid abrasion of the pipe and also to insulate against heat transfer, the sleeve may be composed of a moulded asbestos compound, the primary ingredients of which are asbestos, clay and a binder and as shown in Fig. 1, the intervening sections of the pipe between the hangers may be covered with insulating material such as 30 and extend over and embrace a portion of the support sleeve as indicated at 32.

The sleeve, itself, preferably comprises two identical sections adapted to be assembled upon a plane 34, each section being provided with mating faces 36 and 38. In order to secure the sections against movement when assembled an interengaging tongue 40 and recess 42 are provided in each of the faces 36 and 38 so as to cooperate with a like tongue and recess arranging in a mating face. The sections when assembled, as will appear in Figs. 3 and 4, provide a flat external bearing face 44 adapted to engage the flat portion 14 of the hanger strap. The remainder of the external surface is rounded as at 46 and adapted to receive the hanger strap ends 18 and 20. To prevent the sleeve from sliding endwise out of the hanger strap, the strap engaging portion of the sleeve is provided with flange shoulders 48 and 50 along either edge and extending parallel with the portion of the sleeve adapted to receive the hanger strap. The shoulders are preferably reduced in height at the ends as is indicated at 52, in order to permit the sleeve to be assembled in the hanger strap without unduly opening or splitting apart the strap end portions 18 and 20.

In practice the hanger straps are secured to the sills and the pipe laid in accordance therewith. At each hanger strap a pair of split sleeves are arranged around the pipe in proper relation and slid longitudinally along the pipe into and between the depending ends of the hanger strap, it being necessary to spread the ends slightly apart in order to clear one of the shoulders 48 or 50 of the split sleeve. By reason of the fact that the shoulder is decreased as at 52, the degree to which the hanger strap must be deformed for this operation is kept at a minimum so that little danger is present of breaking the strap during this operation. Subsequently, the hanger strap is tightened around the sleeve through a bolt 47 and the pipe is thereafter covered with insulating material 30 as is illustrated in Fig. 1.

It will be noted that the half-sections are identical, there being no need for rights and lefts, and thus a single mould is sufficient for casting complete sleeves. The asbestos composition which is preferable for such a sleeve, thus protects the pipe from abrasion from the hanger strap as well as permits the pipe to expand and contract. Where thin walled tubes of copper alloy are employed and stainless steel is used for hangers, the presence of the split sleeve is important since the hard metal in the absence of the sleeve would quickly cut into the wall of the tubing. Through the presence of the shoulders at either end of the sleeve, movement is prevented and the sleeve cannot possibly slide from its proper position. Thus protection against the danger of the pipe rubbing against the metallic hanger strap is assured. Yet, on the other hand, because of the form of the shoulder, hereinabove referred to and illustrated at 52, the sleeves are quickly placed around the pipe and readily slid into position.

Though but a single embodiment of the invention has been illustrated and described, it is to be understood that the invention may be embodied in many various mechanical arrangements. Various changes may be made in the material and in the shape without departing from the spirit of the invention as will be apparent to those skilled in the art and reference therefore should be had to the appended claims for a definition of the limits of the invention.

I claim:

1. In combination, a split bushing and hanger means therefor, said hanger means comprising a pair of spaced strap ends having substantially parallel portions, and end portions adapted for clamping together, said bushing being split into two sections along a central plane substantially parallel with the parallel portions of said strap ends, and said sections being adapted to be closely embraced by said strap ends and having substantial shoulder flanges at each end to engage said strap ends to prevent the bushing from endwise slipping, said shoulder flanges being gradually removed adjacent the root of said strap ends, whereby the bushing may be slid into the hanger strap endwise without severe bending of said hanger strap ends to clear said shoulder flanges.

2. A split bushing composed of heat insulating compound, having an aperture therethrough, and mating faces, each portion of said bushing being identical with respect to the other, and each mating face having a recess and a tongue adapted for inter-engagement with a similar recess and tongue on a mating face, said split bushing having a flat exterior bearing surface transverse to said mating faces and substantially parallel with the axis of said aperture, and a hanger engaging surface extending from either side of said bearing surface around the bushing, said hanger engaging surface having raised shoulders at each edge thereof extending around the bushing, said shoulders gradually disappearing as the bearing surface is approached, whereby a split hanger strap may receive the bushing without undue spreading of the hanger strap.

3. In a pipe hanger for vehicles and the like having transverse supporting sills, in combination a hanger strap having a flat central portion secured to a sill and depending end portions shaped to embrace a split bushing, a split bushing having an aperture therethru positioned and embraced by said hanger strap, said bushing being adapted to be inserted into the hanger strap endwise upon slight spreading of the end portions thereof, said split bushing having a flat bearing portion, and a strap receiving portion having flanges on each side thereof to prevent slippage endwise out of the hanger, said flanges gradually reducing as the flat bearing surface is approached.

4. A sleeve composed of two mating parts divided upon a central plane, said parts having mating faces and each face having a tongue and a recess adapted to extend into and receive a recess and tongue of a mating face and said parts having an external flat bearing surface transverse to said dividing plane and a strap receiving surface extending around the exterior of said parts from one side of said bearing surface to the other, said strap receiving surface being bounded by shoulder flanges extending along the edges of said strap receiving surface, said flanges gradually reducing as the flat bearing surface is approached.

5. A sleeve composed of two identical mating parts divided upon a central plane, said parts having mating faces and each face having a tongue and a recess adapted to extend into and receive a recess and tongue of a mating face and said parts having an external flat bearing surface transverse to said dividing plane and a strap receiving surface extending around the exterior of said parts from one side of said bearing surface to the other, said strap receiving surface being bounded by shoulder flanges extending along the edges of said strap receiving surface, said flanges gradually reducing as the flat bearing surface is approached.

6. A sleeve or bushing comprised of two identical mating parts divided upon a plane passing through the axis of the sleeve, said parts having opposed mating faces in said plane and on opposite sides of the axis of the sleeve, said mating faces being for the most part flat, each mating face of each part having a tongue projecting from the plane of the flat main part thereof and a recess depressed below said plane, said tongue and recess on one part being adapted to extend into and receive, respectively, a corresponding recess and tongue on the opposed mating face of the other part, and said parts each having an external flat face transverse to the dividing plane and forming with the corresponding external flat face of the other part, a flat bearing surface parallel to the axis of the sleeve.

DAVID L. BUCHANAN.